United States Patent [19]

Matsumura et al.

[11] Patent Number: 4,826,904
[45] Date of Patent: May 2, 1989

[54] COATING COMPOSITION

[75] Inventors: Shoichi Matsumura; Toshiro Nanbu; Hisao Furukawa, all of Kobe, Japan

[73] Assignee: Kanegafuchi Kagaku Kogyo Kabushiki Kaisha, Osaka, Japan

[21] Appl. No.: 124,237

[22] Filed: Nov. 23, 1987

[30] Foreign Application Priority Data

Nov. 25, 1986 [JP] Japan .................................. 61-280469

[51] Int. Cl.$^4$ ................................................. C08K 5/11
[52] U.S. Cl. ..................................... 524/314; 524/547; 524/858; 524/863; 525/326.5; 526/279
[58] Field of Search ............... 524/314, 547, 858, 863; 525/326.5; 526/279

[56] References Cited

U.S. PATENT DOCUMENTS

| | | | |
|---|---|---|---|
| 3,457,173 | 7/1969 | Pater | 524/314 |
| 4,427,824 | 1/1984 | Kato et al. | 524/547 |
| 4,451,602 | 5/1984 | Furukawa et al. | 524/188 |
| 4,539,359 | 9/1985 | Kato et al. | 524/547 |
| 4,567,221 | 1/1986 | Maruyama et al. | 524/547 |
| 4,578,417 | 3/1986 | Furukawa et al. | 524/547 |
| 4,579,913 | 4/1986 | Keogh | 524/547 |

FOREIGN PATENT DOCUMENTS

| | | | |
|---|---|---|---|
| 1033466 | 6/1966 | United Kingdom | 524/314 |
| 2033402 | 5/1980 | United Kingdom | 524/314 |

Primary Examiner—Joseph L. Schofer
Assistant Examiner—J. M. Reddick
Attorney, Agent, or Firm—Armstrong, Nikaido, Marmelstein & Kubovcik

[57] ABSTRACT

A coating composition comprising:

(A) 100 parts by weight of a vinyl polymer having on the main polymer chain end or a side chain thereof at least one silyl group containing a silicon atom to which a hydrolyzable group is linked, per one polymer molecule, the main chain of the vinyl polymer consisting essentially of a polymer of a vinyl monomer, (B) 0 to 10 parts by weight of a curing catalyst, (C) 0 to 10 parts by weight of a hydrolyzable ester compound, and (D) 0.5 to 100 parts by weight of a dialkyl ester of dibasic acid having the formula (1):

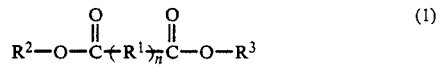

The coating composition of the present invention has excellent adhesion to under coats, and therefore it is suitable for use as automotive refinishing paints and industrial coatings.

6 Claims, No Drawings

COATING COMPOSITION

BACKGROUND OF THE INVENTION

The present invention relates to a coating composition having improved adhesion, and more particularly to a coating composition having excellent adhesion to under coats which is improved by using a dialkyl ester of dibasic acid as a solvent.

As a process for improving adhesion of a hydrolyzable silyl group-containing vinyl copolymer to under coats, there have hitherto been known a process wherein a polar group such as carboxyl group or hydroxyl group is introduced into a main chain of the vinyl copolymer, a process wherein an amine silane coupling agent or an epoxy-modified amine silane coupling agent is admixed with the vinyl copolymer, and the like.

An object of the present invention is to provide a coating composition having excellent adhesion to under coats.

This and other objects of the present invention will become apparent from the description hereinafter.

SUMMARY OF THE INVENTION

The present inventors have paid attention to solvents in solvent coatings, which is one of the essential components of solvent coatings in addition to a main agent and additives, and studied the influence of solvents in solvent coatings using a hydrolyzable silyl group-containing vinyl copolymer on the adhesion to various under coats. As a result, it has now been found that a dialkyl ester of dibasic acid has great influence on the improvement of adhesion of solvent coatings to films of thermoplastic resin coatings such as CAB-alkyd coating, straight acrylic coating and modified acrylic lacquer and thermoplastic resin coatings such as melamine alkyd coating and acrylic melamine coating.

In accordance with the present invention, there is provided a coating composition comprising:
(A) 100 parts by weight of a vinyl polymer having on the main polymer chain end or a side chain thereof at least one silyl group containing a silicon atom to which a hydrolyzable group is linked, per one polymer molecule, the main chain of the vinyl polymer consisting essentially of a polymer of a vinyl monomer,
(B) 0 to 10 parts by weight of a curing catalyst,
(C) 0 to 10 parts by weight of a hydrolyzable ester compound, and
(D) 0.5 to 100 parts by weight of a dialkyl ester of dibasic acid having the formula (1):

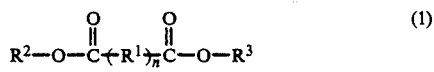

wherein $R^1$ is a bivalent group having 1 to 10 carbon atoms selected from the group consisting of an alkylene group, an arylene group and an aralkylene group, $R^2$ and $R^3$ are the same or different and each is an alkyl group having 1 to 4 carbon atoms, and n is an integer of 1 to 10.

DETAILED DESCRIPTION

A polymer of which the main chain consists essentially of a polymer of a vinyl compound and which has on the polymer chain end or the side chain thereof at least one silicon atom combined with a hydrolyzable group per one polymer molecule (hereinafter referred to as "hydrolyzable silyl group-containing vinyl polymer") is used in the present invention as a component (A). The hydrolyzable silyl group-containing vinyl polymers are prepared by copolymerizing a polymerizable organic silane with a vinyl monomer. Examples of the polymerizable organic silanes are, for instance, a hydrolyzable silyl group-containing vinyl monomer such as γ-methacryloyloxypropyltrimethoxysilane, vinyltrimethoxysilane or vinyltriethoxysilane, and the like. Examples of the vinyl monomers are, for instance, styrene, esters of acrylic or methacrylic acid such as methyl acrylate or methacrylate, ethyl acrylate or methacrylate, butyl acrylate or methacrylate, 2-ethylhexyl acrylate or methacrylate, tridecyl acrylate or methacrylate and stearyl acrylate or methacrylate; acrylamide, acrylonitrile, methacrylamide, N-methyloyl acrylamide or methacrylamide, maleic anhydride, acrylic acid, methacrylic acid, a vinyl monomer having hydroxyl group such as 2-hydroxyethyl acrylate or methacrylate, and the like.

The copolymerization of the polymerizable organic silane with the vinyl monomer can be conducted in a usual solution polymerization manner. A mixture of the polymerizable organic silane, the vinyl monomers, a radical polymerization initiator and, for obtaining the silyl group-containing vinyl polymer (A) having a molecular weight of 3,000 to 50,000 if necessary, a chain transfer agent such as t-dodecylmercaptan is reacted at a temperature of 50° to 150° C. It is preferable to use, in the copolymerization, non-reactive solvents, e.g., hydrocarbons such as toluene, xylene, n-hexane and cyclohexane, esters of acetic acid such as methyl acetate and butyl acetate, alcohols such as methanol, ethanol, isopropanol and n-butanol, ethers such as methyl cellosolve and ethyl cellosolve, and the like.

In the present invention, a curing catalyst as a component (B) may be used or not used. Examples of the curing catalysts are, for instance, organotin compounds such as dibutyl tin dilaurate, dibutyl tin maleate, dioctyl tin maleate and tin octoate; acidic phosphoric esters such as dibutyl phosphate, dioctyl phosphate, monobutyl phosphate and monooctyl phosphate; amines such as butylamine and ethanolamine, organic acids such as maleic acid and p-toluenesulfonic acid, organic titanate such as tetrabutyl titanate, organic aluminum compounds such as tributoxyaluminum, and the like.

The curing catalyst is used in an amount of 0 to 10 parts by weight, preferably from 0 to 5 parts by weight, per 100 parts by weight of the hydrolyzable silyl group-containing vinyl polymer (A).

A hydrolyzable ester compound is used in the present invention as a component (C). Examples of the hydrolyzable ester compound are, for instance, orthoformic esters such as methyl orthoformate and ethyl orthoformate, orthoacetic esters such as methyl orthoacetate and ethyl orthoacetate, hydrolyzable silicon compounds such as methyltrimethoxysilane, methyltriethoxysilane, ethyl silicate, methyl silicate, γ-methacryloyloxypropyltrimethoxysilane, vinyltrimethoxysilane and vinyltris(2-methoxyethoxy)silane, and the like. The hydrolyzable ester compound (C) is used in order to stabilize the hydrolyzable silyl group-containing vinyl polymer (A) and it may be added before or after the copolymerization of the hydrolyzable silyl group-containing vinyl polymer (A).

The hydrolyzable ester compound (C) is used in an amount of 0 to 10 parts by weight, preferably from 0.5 to 10 parts by weight, per 100 parts by weight of the hydrolyzable silyl group-containing vinyl polymer (A).

A dialkyl ester of dibasic acid used in the present invention as a component (D) has the formula (1):

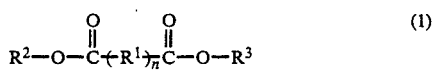

$$R^2-O-\underset{\|}{\overset{O}{C}}-(R^1)_n-\underset{\|}{\overset{O}{C}}-O-R^3 \quad (1)$$

wherein $R^1$ is a bivalent group having 1 to 10 carbon atoms selected from the group consisting of an alkylene group, an arylene group and an aralkylene group, $R^2$ and $R^3$ are the same or different and each is an alkyl group having 1 to 4 carbon atoms, and n is an integer of 1 to 10.

Examples of the dialkyl esters of dibasic acid (D) are, for instance, dimethyl malonate, dimethyl succinate, dimethyl maleate, dimethyl glutarate, dimethyl adipate, diethyl malonate, diethyl succinate, and the like.

The dialkyl ester of dibasic acid (D) is used in an amount of 0.5 to 100 parts by weight, preferably from 2 to 50 parts by weight, per 100 parts by weight of the hydrolyzable silyl group-containing vinyl polymer (A). When the amount of the dialkyl ester of dibasic acid (D) is less than 0.5 parts by weight, the adhesion is lowered. On the other hand, when the amount is more than 100 parts by weight, the initial drying property is lowered.

The dialkyl ester of dibasic acid (D) may be added before or during the polymerization of the hydrolyzable silyl group-containing vinyl polymer (A). Also, the ester (D) can be used as a solvent in the preparation of the vinyl polymer (A). Further the ester (D) can be used as a solvent or a diluent of solution coatings.

Although the reason why the dialkyl ester of dibasic acid (D) can improve the adhesion of coatings is not made clear, it is considered that the dialkyl ester of dibasic acid can dissolve coated films of under coats.

As a solvent used in the coating composition of the present invention in addition to the component (D), there can be used hydrocarbons such as toluene, xylene, hexane and an aromatic solvent commercially available under the tradename "Solvesso#100" made by Toa Nenryo Kogyo Kabushiki Kaisha, esters of acetic acid such as ethyl acetate, butyl acetate and isobutyl acetate, alcohols such as methanol, ethanol, isopropanol, n-buthanol and isobuthanol, ethers such as methyl cellosolve, ethyl cellosolve, butyl cellosolve and ethyl cellosolve acetate, ketones such as acetone, methyl ethyl ketone, methyl isobutyl ketone, diacetone alcohol, acetyl acetone and isophorone, and the like.

The coating composition comprising the components (A), (B), (C) and (D) of the present invention may contain or not contain a known agent for improving adhesion. When using the agent for improving adhesion, there can be used aminosilane compounds such as γ-aminopropyltrimethoxysilane, γ-aminopropyltriethoxysilane, N-β-aminopropyltrimethoxysilane and N-β-(aminoethyl)-aminopropyltriethoxysilane, and reaction products of the above-mentioned aminosilane compound and an epoxy compound. Examples of the epoxy compounds are, for instance, epoxy silane compounds such as γ-glycidoxypropyltrimethoxysilane and β-(3,4-epoxycyclohexyl)ethyltrimethoxysilane, bisphenol A epoxy resins, epoxyurethane resins, novolak epoxy resins, and the like.

The composition of the present invention may further contain various pigments, alkyd resins, cellulose resins such as cellulose acetate, butyrate and nitrocellulose, acrylic resins, and polyvinyl butyral resins, according to the use of the composition.

The coating composition of the present invention is suitable for use as automotive refinishing paints, industrial coatings, and the like, since its adhesion is improved.

The present invention is more specifically described and explained by means of the following Examples in which all % and part are by weight unless otherwise noted. It is to be understood that the present invention is not limited to the Examples and various changes and modifications may be made in the present invention without departing from the spirit and scope thereof.

REFERENCE EXAMPLE 1

To 200 g of xylene heated at 100° C. was added dropwise with stirring under nitrogen gas for 5 hours a mixture of 100 g of γ-methacryloyloxypropyltrimethoxysilane, 70 g of styrene, 100 g of butyl acrylate,, 176 g of methyl methacrylate, 50 g of stearyl methacrylate, 4 g of acrylamide and 27 g of azobisisobutyronitrile. A solution of 3 g of azobisisobutyronitrile dissolved in 100 g of toluene was further added dropwise to the system for 1 hour, and the polymerization was continued for 2 hours. To the obtained reaction mixture was added 36 g of xylene to give a silyl group-containing vinyl copolymer in the form of a solution, having a solid content of 60%. The thus obtained copolymer had a number average molecular weight of 4,500 measured by gel permeation chromatography (hereinafter referred to as "GPC").

EXAMPLE 1

A straight acrylic coating (silver) was coated on a polished mild steel plate as a metallic base and the film was subjected to the setting at room temperature for about 30 minutes [thickness of the dried film (metallic base layer): 30μ]. There were mixed 100 g of the silyl group-containing vinyl copolymer prepared in Reference Example 1, 3 g of methyl orthoacetate, 30 g of a mixture of dimethyl succinate, dimethyl glutarate and dimethyl adipate (weight ratio of dimethyl succinate: dimethyl glutarate: dimethyl adipate=16.5:66:17) (commercially available from Du Pont Japan Kabushiki Kaisha under the tradename "DBE"), 0.6 g of dioctyl phosphate and 16.4 g of xylene to give a clear coating. The thus obtained clear coating was sprayed on the steel plate to give a film having a metallic base layer and a clear layer [thickness of the dried film of clear coating (clear layer): 50μ]on the plate. After drying the film at 23° C. for 7 days, the cross-cut test of the obtained film was conducted as follows:

The paint film having a size of about 2 cm×about 2 cm was cut in the midde with a razor blade to form a square having a size of about 5 mm×about 5 mm. A cellophane adhesive tape having a width of 25 mm was stuck on the above square and was peeled off. The ratio of the area of the clear layer which adhered to the metallic base layer to the whole area of the square was (from 9 to 10)/10.

EXAMPLE 2

The procedure of Example 1 was repeated except that a CAB-alkyd coating was employed as the metallic base [thickness of the dried film (the metallic base layer): 15μ]to give a film having a metallic base layer and a clear layer on the plate. The cross-cut test was conducted in the same manner as in Example 1.

The ratio of the area of the clear layer which adhered to the metallic base layer to the whole area of the square was (from 9 to 10)/10.

COMPARATIVE EXAMPLE 1

The procedure of Example 1 was repeated except that xylene was employed instead of DBE to give a film having a metallic base layer and a clear layer on the plate. The cross-cut test was conducted in the same manner as in Example 1.

The ratio of the area of the clear layer which adhered to the metallic base layer to the whole area of the square was 0/10.

COMPARATIVE EXAMPLE 2

The procedure of Example 2 was repeated except that xylene was employed instead of DBE to give a film having a metallic base layer and a clear layer. The cross-cut test was conducted in the same manner as in Example 1.

The ratio of the area of the clear layer which adhered to the metallic base layer to the whole area of the square was 5/10.

In addition to the ingredients used in the Examples, other ingredients can be used in the Examples as set forth in the specification to obtain substantially the same results.

What we claim is:

1. A coating composition comprising:
   (a) 100 parts by weight of a hydrolyzable silyl group-containing vinyl polymer having on the main polymer chain end or a side chain thereof at least one silyl group containing a silicon atom to which a hydrolyzable group is linked, per one polymer molecule, the main chain of said hydrolyzable silyl group-containing vinyl polymer consisting essentially of a polymer of a vinyl monomer; and
   (b) 0.5 to 100 parts by weight of a dialkyl ester of a dibasic acid having the formula (1):

$$R^2-O-\overset{O}{\underset{\|}{C}}(R^1)_{\overline{n}}\overset{O}{\underset{\|}{C}}-O-R^3 \tag{1}$$

wherein $R^1$ is a bivalent group having 1 to 10 carbon atoms selected from the group consisting of alkylene, arylene and aralkylene, $R^2$ and $R^3$ are the same or different and each is an alkyl having 1 to 4 carbon atoms, and n is an integer of 1 to 10.

2. The composition of claim 1, wherein the amount of said dialkyl ester of a dibasic acid is from 2 to 50 parts by weight per 100 parts by weight of said hydrolyzable silyl group-containing vinyl polymer.

3. The composition of claim 1, further comprising:
   (c) 0 to 10 parts by weight of a curing catalyst for curing said hydrolyzable silyl group-containing vinyl polymer; and
   (d) 0 to 10 parts by weight of a stabilizer for stabilizing said hydrolyzable silyl group-containing vinyl polymer, said stabilizer being selected from hydrolyzable esters.

4. The composition of claim 1, wherein said hydrolyzable silyl group-containing vinyl polymer is obtained by copolymerizing a polymerizable organic silane and a vinyl monomer.

5. The composition of claim 4, wherein said polymerizable organic silane is selected from the group consisting of γ-methacryloyloxypropyltrimethoxysilane, vinyltrimethoxysilane, and vinyltriethoxysilane.

6. The composition of claim 4, wherein said vinyl monomer is selected from the group consisting of styrene, esters of acrylic acid, esters of methacrylic acid, acrylamide, acrylonitrile, methacrylamide, N-methyloylacrylamide, maleic anhydride, acrylic acid, methacrylic acid and hydroxyl group-containing vinyl monomers.

* * * * *